Sept. 17, 1940.     L. B. COMPAÑÓ     2,215,146
ATTACHING BRACKET FOR VEHICLE JACKS
Filed Nov. 1, 1939     2 Sheets-Sheet 1
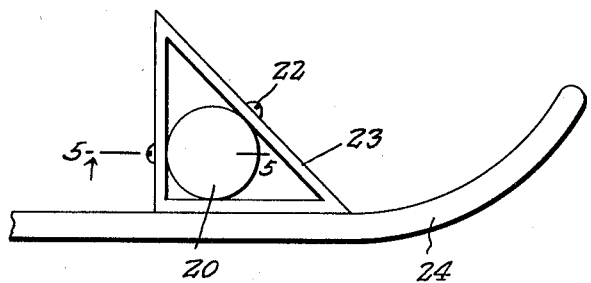
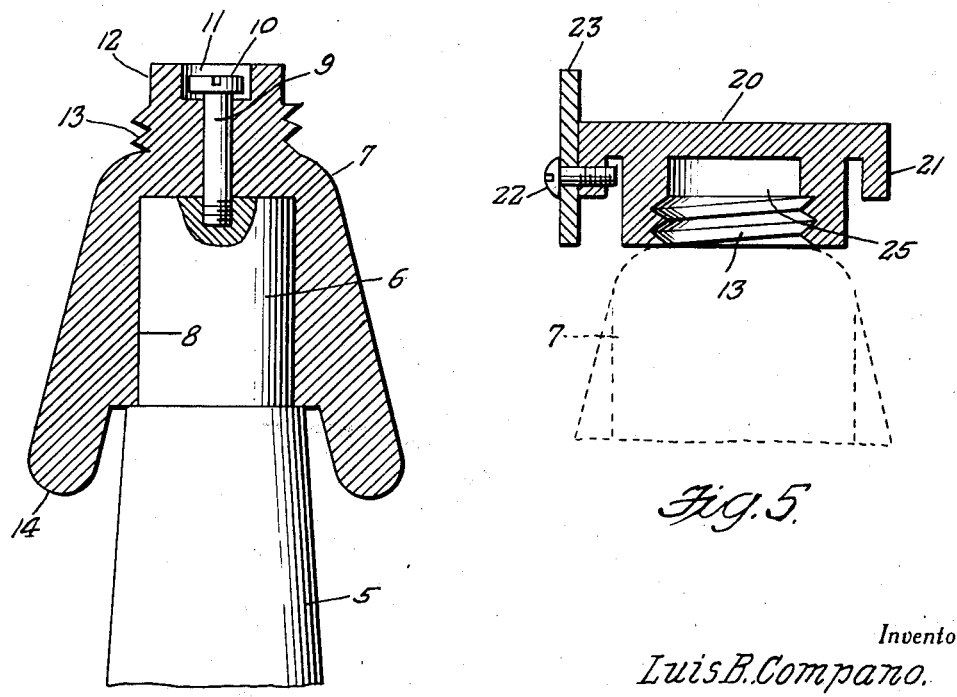
Inventor
Luis B. Compano.
By Clarence A. O'Brien
and Hyman Berman
Attorneys

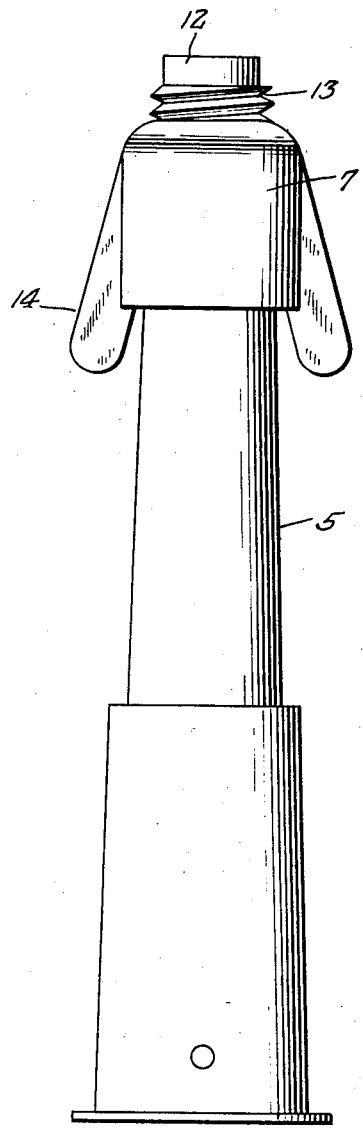
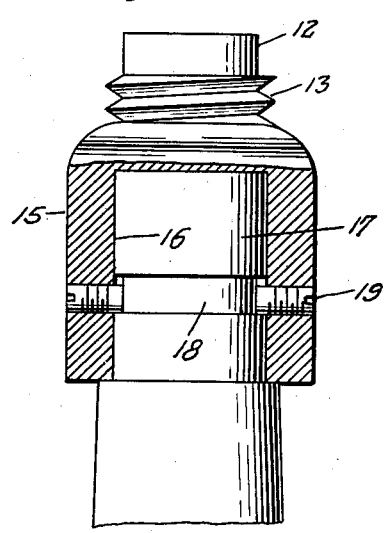
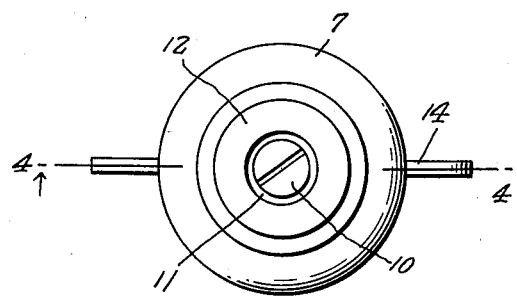

Patented Sept. 17, 1940

2,215,146

UNITED STATES PATENT OFFICE 2,215,146

ATTACHING BRACKET FOR VEHICLE JACKS

Luis Blanco Compañó, Habana, Cuba

Application November 1, 1939, Serial No. 302,456

5 Claims. (Cl. 254—133)

The present invention relates to jacks for vehicles and has for its primary object to provide an attaching bracket secured to the vehicle and to which the jack may be attached whereby to maintain the jack in a fixed position to the vehicle to prevent accidental displacement of the jack while the vehicle is being raised or elevated.

A further object of the invention is to provide an adaptor socket fixedly secured to the upper end of the jack and adapted for threaded engagement in the attaching plate which is secured to the vehicle.

A further object is to provide a device of this character of simple and practical construction, which is efficient and reliable in performance, which may be installed in position in any suitable part of the vehicle and which is otherwise well adapted for the purposes for which the same is intended.

Other objects and advantages reside in the details of construction as more fully hereinafter described and claimed, reference being had to the accompanying drawings forming part hereof, wherein like numerals refer to like parts throughout and in which:

Figure 1 is a fragmentary top plan view of a vehicle bumper showing the jack attaching bracket in position thereon.

Figure 2 is a side elevational view of the jack showing the adaptor socket secured to the upper end thereof.

Figure 3 is a top plan view of the adaptor socket.

Figure 4 is a sectional view taken substantially on a line 4—4 of Fig. 3.

Figure 5 is a fragmentary sectional view taken substantially on a line 5—5 of Fig. 1 and Figure 6 is a vertical sectional view through a modified form of adaptor socket.

Referring now to the drawings in detail the numeral 5 designates a telescoping jack of conventional construction, the uppermost telescoping section being designated at 6 and adapted for insertion in an adaptor socket designated generally at 7.

The adaptor socket, in the form of the invention illustrated in Figs. 2, 3, and 4 of the drawings is of substantially cylindrical form and is provided at its underside with a cylindrical recess 8 within which the upper end of the section 6 is snugly received. A bolt 9 is inserted through the top of the adaptor socket for threaded engagement in the top of the upper portion 6 of the jack. The head of the bolt 10 is countersunk in a recess 11 on top of the adaptor socket.

A reduced extension 12 projects upwardly from the adaptor socket and is externally threaded as shown at 13. A pair of radially projecting wings 14 also are formed on the outer surface of the adaptor socket to facilitate manipulation thereof.

In the modified form of the invention illustrated in Fig. 6 the adaptor socket designated generally at 15 is provided with the recess 16 in its underside and within which the upper portion 17 of the jack is inserted. The jack is formed with an annular groove 18 for receiving set screws 19 threaded through the side walls of the adaptor socket to secure the latter in position on the top of the jack.

In order to secure the jack to the vehicle an attaching bracket 20 is provided preferably of cylindrical form and having a skirted portion 21 spaced outwardly from the side walls of the bracket for receiving attaching screws 22 for attaching the bracket to the frame 23 of a vehicle bumper 24 of conventional construction. The underside of the bracket 20 is provided with an internally threaded recess 25 for threadedly receiving the threaded upper extension 13 of the adaptor socket whereby to secure the jack in position to the vehicle against accidental displacement thereof during the raising or lowering of the vehicle on the jack.

While I have illustrated the invention as attached to the bumper of the vehicle it will be understood that the attaching bracket 20 may be secured in any convenient position to the chassis or frame of the vehicle.

It is believed the details of construction, advantages and manner of use of the device will be readily understood from the foregoing without further detailed explanation.

What is claimed as new is:

1. An adaptor bracket for vehicle jacks comprising a socket secured to the upper end of the jack, a bracket member adapted for attaching to the vehicle and a threaded connection between the socket and the bracket member.

2. An adaptor bracket for vehicle jacks comprising a socket secured to the upper end of the jack, a reduced threaded extension rising from the socket, a bracket member adapted for attaching to the vehicle and an internally threaded recess in the bracket member for receiving said reduced extension of the socket.

3. An adaptor bracket for vehicle jacks comprising a socketed member adapted for receiving the upper end of the jack for mounting thereon, means for securing the member against removal from the jack, an externally threaded extension rising from the member, a cap having an internally threaded recess for receiving the extension of the socket member and means for attaching the cap to a vehicle.

4. An adaptor bracket for vehicle jacks comprising in combustion a socket member, a telescoping jack having its upper end provided with an annular groove and adapted for insertion in said member, set screws carried by the member engaged in the groove to secure the member to the jack, a threaded extension on the member, a cap having an internally threaded recess for receiving the extension and means for securing the cap to a vehicle.

5. An adaptor bracket for vehicle jacks comprising a socketed member adapted for receiving the upper end of the jack for mounting thereon, means for securing the member against removal from the jack, an externally threaded extension rising from the member, a cap having an internally threaded recess for receiving the extension of the socket member, and a skirt surrounding the cap and adapted for receiving attaching screws for securing the cap to a vehicle.

LUIS BLANCO COMPAÑÓ.